United States Patent
Min

(10) Patent No.: US 10,528,666 B2
(45) Date of Patent: Jan. 7, 2020

(54) METHOD AND APPARATUS FOR DETERMINING DOMAIN OF SENTENCE

(71) Applicant: SAMSUNG ELECTRONICS CO., LTD., Suwon-si (KR)

(72) Inventor: Yunhong Min, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 56 days.

(21) Appl. No.: 15/824,743

(22) Filed: Nov. 28, 2017

(65) Prior Publication Data

US 2019/0050395 A1    Feb. 14, 2019

(30) Foreign Application Priority Data

Aug. 14, 2017  (KR) .................. 10-2017-0102960

(51) Int. Cl.
*G06F 17/27* (2006.01)
*G06N 3/04* (2006.01)
*G06N 3/08* (2006.01)

(52) U.S. Cl.
CPC .......... *G06F 17/2785* (2013.01); *G06N 3/04* (2013.01); *G06N 3/088* (2013.01)

(58) Field of Classification Search
CPC ............ G06F 17/2785; G06F 17/2765; G06F 2207/4824
See application file for complete search history.

(56) References Cited

U.S. PATENT DOCUMENTS

| 6,523,026 | B1* | 2/2003 | Gillis .................. G06F 16/3332 |
| 2015/0356401 | A1* | 12/2015 | Vinyals .................... G06N 3/02 706/15 |
| 2016/0055240 | A1 | 2/2016 | Tur et al. |
| 2016/0307566 | A1* | 10/2016 | Bellegarda .......... G06F 17/2785 |
| 2017/0103062 | A1 | 4/2017 | Zhang et al. |
| 2018/0165554 | A1* | 6/2018 | Zhang ...................... G06N 3/04 |
| 2018/0336183 | A1* | 11/2018 | Lee ..................... G06F 17/2785 |

FOREIGN PATENT DOCUMENTS

| KR | 10-1309042 B1 | 9/2013 |
| KR | 10-2014-0138011 A | 12/2014 |
| KR | 10-2014-0138648 A | 12/2014 |

OTHER PUBLICATIONS

Liu, Biao, et al. "Incorporating domain and sentiment supervision in representation learning for domain adaptation." Twenty-Fourth International Joint Conference on Artificial Intelligence. 2015. (Year: 2015).*

Yu, Wenchao, et al. "Embedding with autoencoder regularization." Joint European Conference on Machine Learning and Knowledge Discovery in Databases. Springer, Berlin, Heidelberg, 2013. (Year: 2013).*

(Continued)

*Primary Examiner* — Brian L Albertalli
(74) *Attorney, Agent, or Firm* — NSIP Law

(57) ABSTRACT

Methods and apparatuses for determining a domain of a sentence are disclosed. The apparatus may generate, using an autoencoder, an embedded feature from an input feature indicating an input sentence, and determine a domain of the input sentence based on a location of the embedded feature in an embedding space where embedded features are distributed.

23 Claims, 12 Drawing Sheets

(56) References Cited

OTHER PUBLICATIONS

Hill, Felix, Kyunghyun Cho, and Anna Korhonen. "Learning distributed representations of sentences from unlabelled data." arXiv preprint arXiv:1602.03483 (2016). (Year: 2016).*
Li, Jiwei, Minh-Thang Luong, and Dan Jurafsky. "A hierarchical neural autoencoder for paragraphs and documents." arXiv preprint arXiv:1506.01057 (2015). (Year: 2015).*
Xie, Junyuan, Ross Girshick, and Ali Farhadi. "Unsupervised deep embedding for clustering analysis." International conference on machine learning. 2016. (Year: 2016).*
Ryu, Seonghan, et al. "Neural Sentence Embedding Using Only In-Domain Sentences for Out-of-Domain Sentence Detection in Dialog Systems." *Pattern Recognition Letters* 88 (2017): 26-32. (7 pages, in English)
Wieting, John, et al. "Towards Universal Paraphrastic Sentence Embeddings." *arXiv preprint arXiv:1511.08198* (2015): 1-19. (19 pages, in English).

\* cited by examiner

METHOD AND APPARATUS FOR DETERMINING DOMAIN OF SENTENCE

CROSS-REFERENCE TO RELATED APPLICATIONS

This application claims the benefit under 35 USC § 119(a) of Korean Patent Application No. 10-2017-0102960 filed on Aug. 14, 2017 in the Korean Intellectual Property Office, the entire disclosure of which is incorporated herein by reference for all purposes.

BACKGROUND

1. Field

The following description relates to determining a domain of a sentence.

2. Description of Related Art

In a language-based recognition system, determining whether an input sentence is related to a task that is currently of interest may be consequential. Thus, various methods have been suggested to determine a domain of a sentence, or to detect an out-of-domain sentence.

In an out-of-domain sentence detecting method that uses a threshold value to distinguish between an in-domain sentence and an out-of-domain sentence, a new threshold value may need to be obtained at each time of training, thereby causing inefficiency. However, in an out-of-domain sentence detecting method that does not use a principle of distinguishing between an in-domain sentence and an out-of-domain sentence, a variation in a domain determining performance may increase depending on data. Thus, there is a desire for technology for determining a domain of a sentence to improve efficiency in training and to increase a domain determining performance.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of determining a domain of a sentence, the method including generating, using an autoencoder, an embedded feature from an input feature indicating an input sentence, and determining a domain of the input sentence based on a location of the embedded feature in an embedding space where embedded features are distributed.

The determining of the domain may include determining whether the input sentence is an in-domain sentence or an out-of-domain sentence, based on a distance between the location of the embedded feature and a specified location.

The autoencoder may be trained such that embedded features indicating out-of-domain sentences are closer to the specified location, and the determining of the domain may include determining the input sentence to be the out-of-domain sentence, in response to the distance being less than a threshold distance.

The determining of the domain may include generating a reconstructed feature from the embedded feature using the autoencoder, in response to the distance being greater than the threshold distance, generating a reconstruction error based on the input feature and the reconstructed feature, and determining the input sentence to be the out-of-domain sentence, in response to the reconstruction error being greater than a threshold error.

The autoencoder may be trained such that embedded features indicating in-domain sentences are closer to the specified location, and the determining of the domain may include determining the input sentence to be the out-of-domain sentence, in response to the distance being greater than a threshold distance.

The determining of the domain may include generating a reconstructed feature from the embedded feature using the autoencoder, in response to the distance being less than the threshold distance, generating a reconstruction error based on the input feature and the reconstructed feature, and determining the input sentence to the out-of-domain sentence, in response to the reconstruction error being less than a threshold error.

The specified location may be an original point in the embedding space.

The determining of the domain may include calculating an Lp-norm or a Kullback-Leibler divergence (KLD) based on the location of the embedded feature and the specified location, and determining the distance between the location of the embedded feature and the specified location based on the calculating of the Lp-norm or the KLD divergence.

The determining of the domain may include generating a reconstructed feature from the embedded feature using the autoencoder, generating a reconstruction error based on the input feature and the reconstructed feature, and determining the domain of the input sentence based on the reconstruction error and the location of the embedded feature.

The embedded feature may be an activation value or a pre-activation value of a hidden layer in the autoencoder.

The input feature may be an embedded feature generated from the input sentence by a neural network.

The input feature may include any one or any combination of one-hot vector, a real vector, or a function corresponding to an input layer in the autoencoder.

The reconstructed feature may include any one or any combination of one-hot vector, a real vector, or a function corresponding to an output layer in the autoencoder.

The determining of the domain may include determining the domain of the input sentence from among reference domains based on specified locations respectively corresponding to the reference domains and the location of the embedded feature.

The autoencoder may be trained such that embedded features indicating in-domain sentences respectively belonging to the reference domains are closer to the specified locations, respectively, and the determining of the domain of the input sentence may include identifying a second location closest to the location of the embedded feature among the specified locations, and determining that the input sentence belongs to a second domain corresponding to the second location based on whether a distance between the location of the embedded feature and the second location is less than a threshold distance.

The determining that the input sentence belongs to the second domain may include generating a reconstructed feature from the embedded feature using the autoencoder, in response to the distance between the location of the embedded feature and the second location being less than the threshold distance, generating a reconstruction error based on the input feature and the reconstructed feature, and determining the input sentence to be an out-of-domain sentence, in response to the reconstruction error being less than a threshold error, wherein the out-of-domain sentence may be a sentence not belonging to the reference domains.

In another general aspect, there is provided a training method to determine a domain of a sentence, the training method including applying, to an autoencoder, at least one training feature indicating a training sentence, and training the autoencoder such that a location of an embedded feature generated from the training feature is closer to a specified location in an embedding space where embedded features are distributed.

The applying of the at least one training feature to the autoencoder may include applying a first training feature indicating an in-domain sentence to the autoencoder, and applying a second training feature indicating an out-of-domain sentence to the autoencoder, and the training of the autoencoder may include obtaining a first embedded feature generated from the first training feature, training the autoencoder such that a reconstruction error between a reconstructed feature generated from the first embedded feature and the first training feature may be reduced, and training the autoencoder such that a location of a second embedded feature generated from the second training feature may be closer to a second location in the embedding space.

The applying of the at least one training feature to the autoencoder may include applying a first training feature indicating an in-domain sentence to the autoencoder, and applying a second training feature indicating an out-of-domain sentence to the autoencoder, and the training of the autoencoder may include training the autoencoder such that a location of a first embedded feature generated from the first training feature may be closer to a first location in the embedding space, obtaining a second embedded feature generated from the second training feature, and training the autoencoder such that a reconstruction error between a reconstructed feature generated from the second embedded feature and the second training feature may be reduced.

The applying of the at least one training feature to the autoencoder may include applying a first training feature indicating a first domain sentence to the autoencoder, applying a second training feature indicating a second domain sentence to the autoencoder, and applying a third training feature indicating a sentence not belonging to domains, and the training of the autoencoder may include training the autoencoder such that a location of a first embedded feature generated from the first training feature may be closer to a first location in the embedding space, training the autoencoder such that a location of a second embedded feature generated from the second training feature may be closer to a second location in the embedding space, obtaining a third embedded feature generated from the third training feature, and training the autoencoder such that a reconstruction error between a reconstructed feature generated from the third embedded feature and the third training feature is reduced.

In another general aspect, there is provided an apparatus for determining a domain of a sentence, the apparatus including a processor configured to generate, using an autoencoder, an embedded feature from an input feature indicating an input sentence, and determine a domain of the input sentence based on a location of the embedded feature in an embedding space where embedded features are distributed.

In another general aspect, there is provided a training apparatus to determine a domain of a sentence, the training apparatus including a processor configured to apply a training feature indicating a training sentence to an autoencoder, and train the autoencoder such that a location of an embedded feature generated from the training feature is to be closer to a specified location in an embedding space where embedded features are distributed.

Other features and aspects will be apparent from the following detailed description, the drawings, and the claims.

Figure 1:
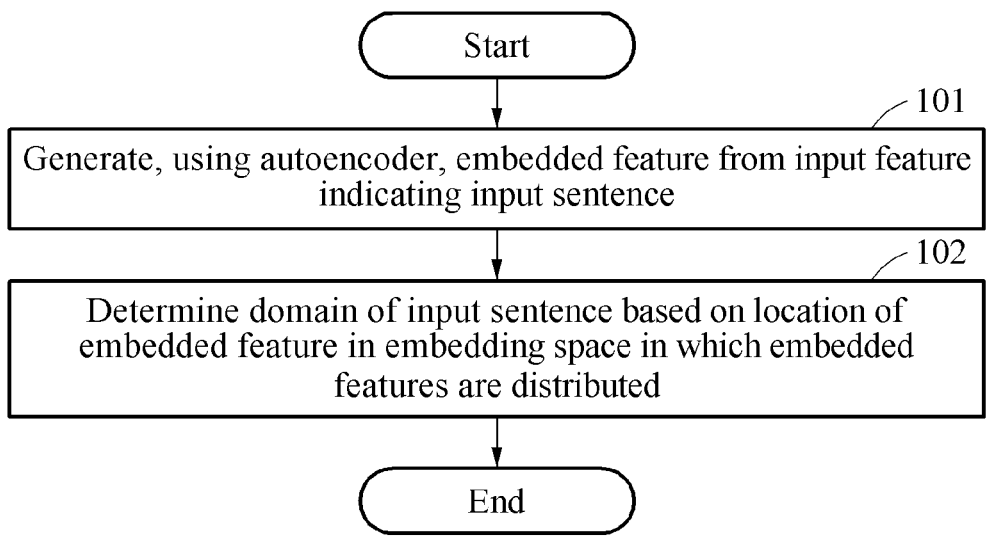
FIG. 1 is a diagram illustrating an example of a method of determining a domain of a sentence.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after gaining a thorough understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

If it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. For example, as used herein, the singular forms "a," "an," and "the," are intended to include the plural forms as well, unless the context clearly indicates otherwise.

FIG. 1 is a diagram illustrating an example of a method of determining a domain of a sentence. Hereinafter, the method of determining a domain of a sentence will be simply referred to as a domain determining method. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer that perform the specified functions, or combinations of special purpose hardware and computer instructions.

Referring to FIG. 1, in operation 101, an apparatus for determining a domain of a sentence, hereinafter simply referred to as a domain determining apparatus, generates an embedded feature from an input feature indicating an input sentence using an autoencoder. In an example, the autoencoder is a type of a neural network that is used to discover effective embedded data by changing a dimension of input data. For example, the autoencoder reduces a dimension of input data, and generates embedded data. In an example, the autoencoder generates an embedded feature by encoding input data associated with a sentence or a word.

In an example, the autoencoder includes an input layer, a hidden layer, and an output layer. The number of nodes in the input layer and the number of nodes in the output layers are equal to each other. A process in which nodes are activated from the input layer to the hidden layer is referred to encoding or embedding. A process in which nodes are activated from the hidden layer to the output layer is referred to decoding or reconstruction. In an example, a structure of the input layer to the hidden layer (input layer→hidden layer) and a structure of the hidden layer to the output layer (hidden layer→output layer) are symmetrical to each other.

In an example, the autoencoder generates an embedded feature by encoding an input feature corresponding to the number of the nodes in the input layer, and generates a reconstructed feature by decoding the embedded feature. The reconstructed feature may correspond to the number of the nodes in the output layer, and the embedded feature may correspond to the number of the nodes in the hidden layer that generates the embedded feature. For example, dimensions of the input feature, the embedded feature, and the reconstructed feature may be determined by the input layer, the hidden layer, and the output layer of the autoencoder, in which the dimension of the input feature and the dimension of the reconstructed feature are equal to each other.

The autoencoder reconstructs the input feature indicating the input sentence to generate the reconstructed feature. The autoencoder may be trained such that the input feature and the reconstructed feature are to be the same. A reconstruction error may be defined based on a difference between the input feature and the reconstructed feature. When the reconstruction error decreases, the input sentence and a reconstructed sentence indicated by the reconstructed feature may be the same or similar to each other. Generating an embedded feature will be described in greater detail with reference to FIG. 2.

Figure 2:
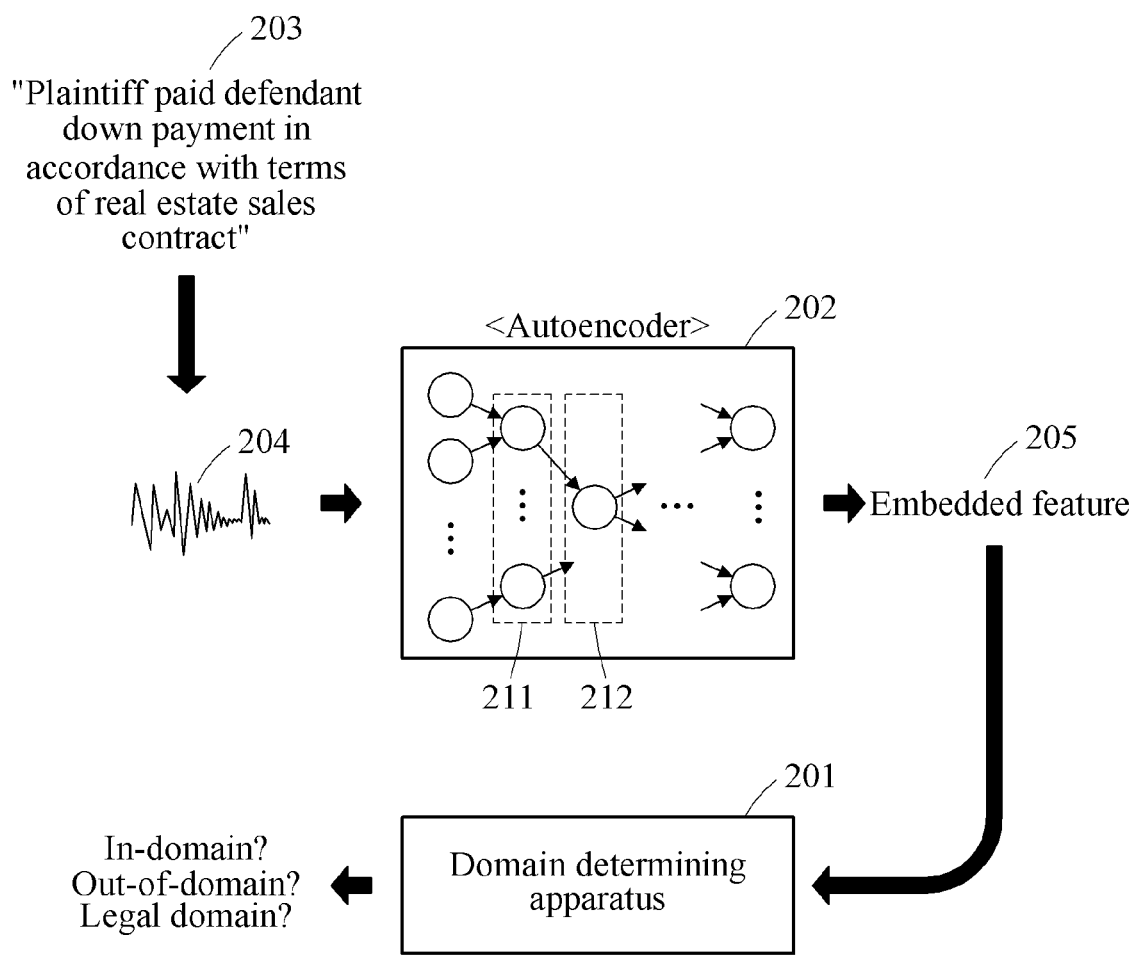
FIG. 2 is a diagram illustrating an example of a method of determining a domain of a sentence.

FIG. 2 is a diagram illustrating an example of a domain determining method.

Referring to FIG. 2, a domain determining apparatus 201 generates an embedded feature 205 from an input feature 204 indicating an input sentence 203 using an autoencoder 202. Although an example of an input being a sentence is described herein, in other examples, the input feature 204 may be a feature of data defined or designed as various types, such as, for example, a word, a phoneme, a morpheme, a phonetic symbol unit, a phrase, a passage, and a paragraph. The example described herein is not provided to limit a type of information implied in data to a certain type, and other types of input may be used without departing from the spirit and scope of the illustrative examples described.

The domain determining apparatus 201 determines a domain of a sentence using the autoencoder 202, and may be configured as, for example, a hardware module, or a software module implemented on hardware module. In an example, the autoencoder 202 is trained in advance to determine a domain of a sentence, and the domain determining apparatus 201 determines a domain of the input sentence 203 using the trained autoencoder 202. In an example, the domain determining apparatus 201 includes the autoencoder 202. In another example, the domain determining apparatus 201 uses the autoencoder 202 disposed outside the domain determining apparatus 201, but various examples may be possible based on design intention. Training an autoencoder will be described in greater detail with reference to FIGS. 6 through 9.

The embedded feature 205 generated by the autoencoder 202 may be an activation value or a pre-activation value of a hidden layer 212 in the autoencoder 202, which may be indicated by a vector or a function. The pre-activation value of the hidden layer 212 may be an activation value of a previous layer 211 of the hidden layer 212.

The input feature 204 indicating the input sentence 203 may be indicated by an one-hot vector, a real vector, or a function that corresponds to an input layer in the autoencoder 202, and a reconstructed feature may be indicated by an one-hot vector, a real vector, or a function that corresponds to an output layer in the autoencoder 202. The input feature 204 may be an embedded feature generated from the input sentence 203 by a neural network. The domain determining apparatus 201 may encode, using the autoencoder 202, the embedded feature generated by the neural network. In such a case, an embedded feature of the embedded feature may be generated. In an example, a neural network or an autoencoder that generates the input feature 204 may be embodied by any one of a convolutional neural network (CNN), a recurrent neural network (RNN), a long short-term memory (LSTM), or a gated recurrent unit (GRU). In an example, the neural network generating the input feature 204 may be embodied through an end-to-end method in combination with the autoencoder 202. In an example, the neural network generating the input feature 204 and the autoencoder 202 may be trained in such an end-to-end method. Various methods may be used, based on design intention, for a structure of the neural network or the autoencoder that generates the input feature 204.

Referring back to FIG. 1, in operation 102, the domain determining apparatus determine the domain of the input sentence based on a location of the embedded feature in an embedding space in which embedded features are distributed. The embedding space refers to a space in which embedded features are distributed and may be defined based on a function defining an embedded feature, or a dimension of the embedding space may be defined based on a dimension of an embedded feature. Determining a domain of a sentence will be described in greater detail with reference to FIG. 2.

Referring back to FIG. 2, the domain determining apparatus 201 may use the embedded feature 205 generated by the autoencoder 202 to determine a domain of a sentence. In an example, the autoencoder 202 is trained in advance to determine a domain of a sentence.

In an example, the domain determining apparatus 201 determines the domain of the input sentence 203 based on a distance between a location of the embedded feature 205 in the embedding space and a location. The domain determining apparatus 201 calculates an Lp-norm or a Kullback-Leibler divergence (KLD) based on the location of the embedded feature 205 and the location, and determines the distance between the location of the embedded feature 205 and the location based on a result of the calculating. For example, when the embedded feature 205 is expressed by a function, the domain determining apparatus 201 calculates the distance using various divergence measuring methods, such as, for example, the KLD. As described, the domain determining apparatus 201 determines the domain of the input sentence 203 using such a generated distance. Various methods may be used to calculate such a distance.

In an example, the autoencoder 202 is trained such that the domain of the input sentence 203 is determined based on the location of the embedded feature 205 in the embedding space, and the domain determining apparatus 201 using the trained autoencoder 202 generates a result of accurately determining the domain without a variation in performance depending on data. In addition, the domain determining apparatus 201 determines the domain by analyzing the embedded feature 205, and thus, may show a stable performance in determining the domain, dissimilar to the neural network configured to directly determine the domain.

In an example, the domain determining apparatus 201 uses a reconstruction error to determine the domain of the input sentence 203. The domain determining apparatus 201 generates a reconstructed feature from the embedded feature 205 using the autoencoder 202. The domain determining apparatus 201 generates the reconstruction error based on the input feature 204 and the reconstructed feature. In an example, the domain determining apparatus 201 determines the domain of the input sentence 203 based on the reconstruction error and the location of the embedded feature 205. The domain determining apparatus 201 may thus improve accuracy in determining the domain based on the reconstruction error in addition to the location of the embedded feature 205. The reconstruction error may be defined by a difference between the input feature 204 and the reconstructed feature or by a loss function, such as, for example, mean square error (MSE) or entropy function. Various other methods may be used to define such a reconstruction error without departing from the spirit and scope of the illustrative examples described.

In an example, the domain determining apparatus 201 is used as a preprocessing step in recognition of a language-based recognition system. Before the language-based recognition system analyzes a sentence, the domain determining apparatus 201 may determine or classify a domain of the sentence to improve efficiency in processing data. For example, when a quantity of data associated with a sentence, which is a target to be analyzed, is large, the domain determining apparatus 201 may classify or reduce the target to be analyzed by determining or classifying a domain of the sentence.

In an example, the domain determining apparatus 201 is used to collect training data in a training device using a sentence, for example, a speech recognition device, a translation device, and an interactive dialog device. The training data may affect efficiency and performance of training, and thus the domain determining apparatus 201 may provide the training device with a sentence suitable for training by determining or classifying a domain of the sentence.

In an example, the domain determining apparatus 201 analyzes the location of the embedded feature 205 in the embedding space, and determines whether the input sentence 203 is an in-domain sentence or an out-of-domain sentence. The in-domain sentence refers to a sentence that belongs to a certain domain, and the out-of-domain sentence refers to a sentence that does not belong to a certain domain. The domain determining apparatus 201 determines a domain to which the input sentence 203 belongs among a plurality of predefined domains by analyzing the location of the embedded feature 205 in the embedding space. For example, the domain determining apparatus 201 may determine that the input sentence 203 belongs to a legal domain among the predefined domains. Hereinafter, an operation of determining a domain of a sentence will be further described with reference to FIGS. 3 through 5.

Figure 3:
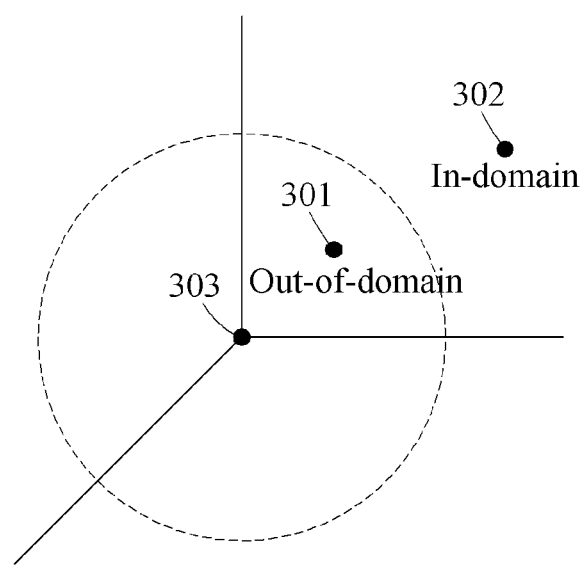
FIG. 3 is a diagram illustrating an example of a method of determining a domain of a sentence.

FIG. 3 is a diagram illustrating an example of a domain determining method.

Referring to FIG. 3, a domain determining apparatus determines whether an input sentence is an in-domain sentence or an out-of-domain sentence based on a relationship between a location of an embedded feature in an embedding space and a location 303. Although the embedding space is illustrated as a three-dimensional (3D) space for a visual description, the embedding space may be defined based on a dimension or a function of the embedded feature as described hereinafter.

In an example, an autoencoder is trained such that embedded features generated from features indicating out-of-domain sentences are closer to the location 303. The location 303 may be determined variously based on design intention, and defined as, for example, an original point in the embedding space.

When a distance between a location 301 of an embedded feature and the location 303 is less than a threshold distance, the domain determining apparatus determines that the input sentence is the out-of-domain sentence between the in-domain sentence and the out-of-domain sentence. When the distance between the location 301 of the embedded feature and the location 303 is greater than the threshold distance, the domain determining apparatus determines that the input sentence is the in-domain sentence between the in-domain sentence and the out-of-domain sentence. The threshold distance may be defined in advance, or obtained through training.

In an example, the domain determining apparatus may use a reconstruction error to determine a domain of the input sentence. The autoencoder may be trained such that reconstruction errors between reconstructed features and embedded features generated from features indicating in-domain sentences are to be reduced. When a distance between a location 302 of an embedded feature and the location 303 is greater than the threshold distance, the domain determining apparatus generates a reconstructed feature from the embedded feature and generates a reconstruction error based on an input feature and the reconstructed feature, using the trained autoencoder. When the reconstruction error is greater than a threshold error, the domain determining apparatus determines that the input sentence is the out-of-domain sentence. The threshold error may be defined in advance, or obtained through training.

When using the domain determining apparatus for preprocessing in a language recognition device, incorrectly determining an out-of-domain sentence to be an in-domain sentence may be more influential or damaging in performance of determining a domain of a sentence, compared to incorrectly determining an in-domain sentence to be an out-of-domain sentence. In such a case, it is desirable to implement the domain determining apparatus so that an operation of determining that an input sentence is an in-domain sentence is performed conservatively. Thus, although the location 302 of the embedded feature is separated far away from the location 303, the domain determining apparatus may determine that the input sentence is the out-of-domain sentence when the reconstruction error is large, thereby reducing an error in determining the domain. However, when determining an in-domain sentence to be an out-of-domain sentence is determined to be more damaging, compared to determining an out-of-domain sentence to be an in-domain sentence, the domain determining apparatus may be implemented as opposed to the preceding.

Figure 4:
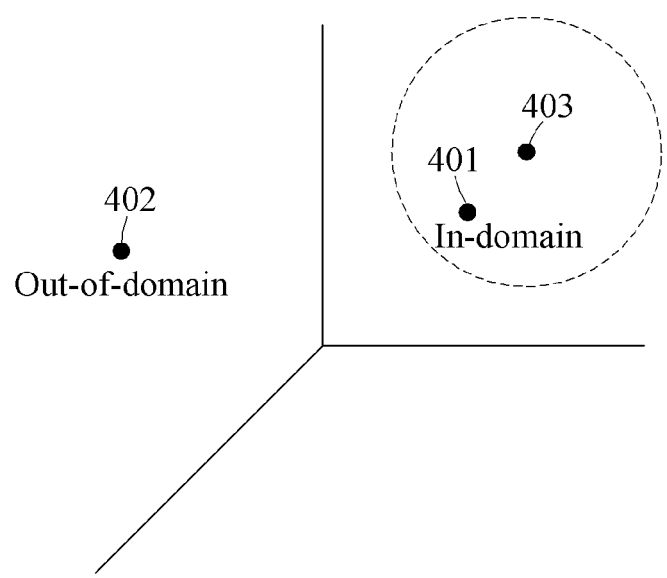
FIG. 4 is a diagram illustrating an example of a method of determining a domain of a sentence.

FIG. 4 is a diagram illustrating an example of a domain determining method.

Referring to FIG. 4, a domain determining apparatus determines whether an input sentence is an in-domain sentence or an out-of-domain sentence based on a relationship between a location of an embedded feature in an embedding space and a location 403. The domain determining apparatus makes a determination in association with an embedded feature 401 close to the location 403 and an embedded feature 402 far away from the location 403, as opposed to the example described above with reference to FIG. 3.

In an example, an autoencoder is trained such that embedded features generated from features indicating in-domain sentences are to be closer to the location 403. When a distance between the location 402 of the embedded feature and the location 403 is greater than a threshold distance, the domain determining apparatus determines that the input sentence is the out-of-domain sentence between the in-domain sentence and the out-of-domain sentence. When a distance between the location 401 of the embedded feature and the location 403 is less than the threshold distance, the domain determining apparatus determines that the input sentence is the in-domain sentence between the in-domain sentence and the out-of-domain sentence.

As described above, the domain determining apparatus may additionally use a reconstruction error to determine a domain of the input sentence. In an example, the autoencoder may be trained such that reconstruction errors between embedded features generated from features indicating out-of-domain sentences and reconstructed features are to be reduced. When the distance between the location 401 of the embedded feature and the location 403 is less than the threshold distance, the domain determining apparatus generates a reconstructed feature from an embedded feature and generates a reconstruction error based on an input feature and the reconstructed feature, using the trained autoencoder. When the reconstruction error is less than a threshold error, the domain determining apparatus determines that the input sentence is the out-of-domain sentence. Thus, even when the location 401 of the embedded feature is close to the location 403, the domain determining apparatus may determine that the input sentence is the out-of-domain sentence when the reconstruction error is small, thereby reducing an error in determining the domain.

Figure 5:
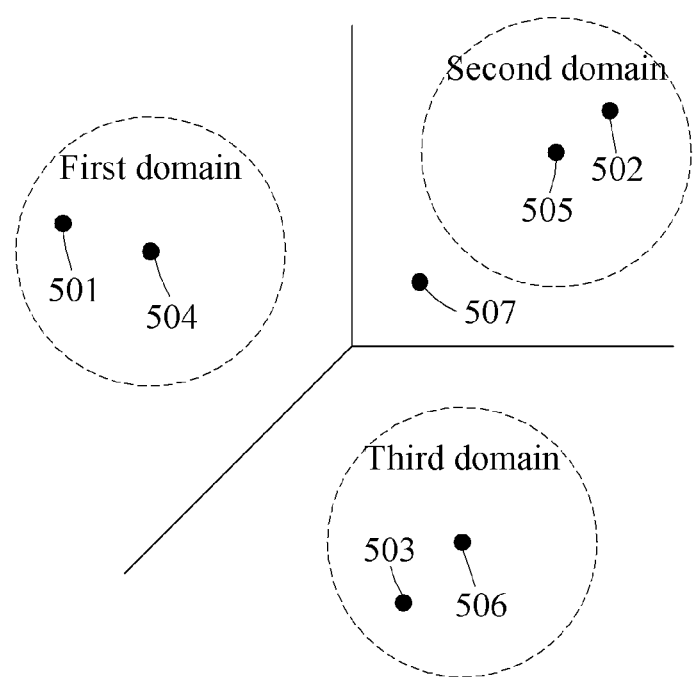
FIG. 5 is a diagram illustrating an example of a method of determining a domain of a sentence.

FIG. 5 is a diagram illustrating an example of a domain determining method.

Referring to FIG. 5, a domain determining apparatus determines a domain to which an input sentence belongs among different domains, for example, a first domain, a second domain, and a third domain as illustrated, based on a relationship between a location of an embedded feature in an embedding space and each of locations 504, 505, and 506, respectively, corresponding to the first domain, the second domain, and the third domain. In addition to an example of an operation of determining whether an input sentence is an in-domain sentence or an out-of-domain sentence, which is described with reference to FIGS. 3 and 4, the domain determining apparatus may also determine a domain to which an input sentence belongs among a plurality of domains.

An autoencoder is trained such that embedded features generated from features indicating in-domain sentences respectively belonging to the first domain, the second domain, and the third domain are to be closer to the locations 504, 505, and 506, respectively. The domain determining apparatus identifies the location 505 that is closest to a location 502 of an embedded feature among the locations 504, 505, and 506. When a distance between the location 502 of the embedded feature and the identified location 505 is less than a threshold distance, the domain determining apparatus determines that the input sentence belongs to the second domain corresponding to the location 505. Similarly, the domain determining apparatus determines that an input sentence corresponding to a location 501 of an embedded feature belongs to the first domain corresponding to the location 504, and an input sentence corresponding to a location 503 of an embedded feature belongs to the third domain corresponding to the location 506. When a distance between a location 507 of an embedded feature and a location closest to the location 507 is greater than the threshold distance, the domain determining apparatus determines that an input sentence corresponding to the location 507 of the embedded feature is an out-of-domain sentence. The out-of-domain sentence used herein may be a sentence that does not belong to any one of the domains, for example, the first domain, the second domain, and the third domain.

As described above, the domain determining apparatus may additionally use a reconstruction error to determine a domain of an input sentence. The autoencoder may be trained such that reconstruction errors between embedded features generated from features indicating out-of-domain sentences and reconstructed features are reduced. When the distance between the location 502 of the embedded feature and the location 505 is less than the threshold distance, the domain determining apparatus may generate a reconstructed feature from the embedded feature and generate a reconstruction error based on an input feature and the reconstructed feature, using the trained autoencoder. When the reconstruction error is less than a threshold error, the domain determining apparatus may determine that the input sentence is an out-of-domain sentence. Thus, although the location 502 of the embedded feature is close to the location 505, the domain determining apparatus may determine that the input sentence is the out-of-domain sentence when the reconstruction error is small, thereby reducing an error in determining the domain.

Figure 6:
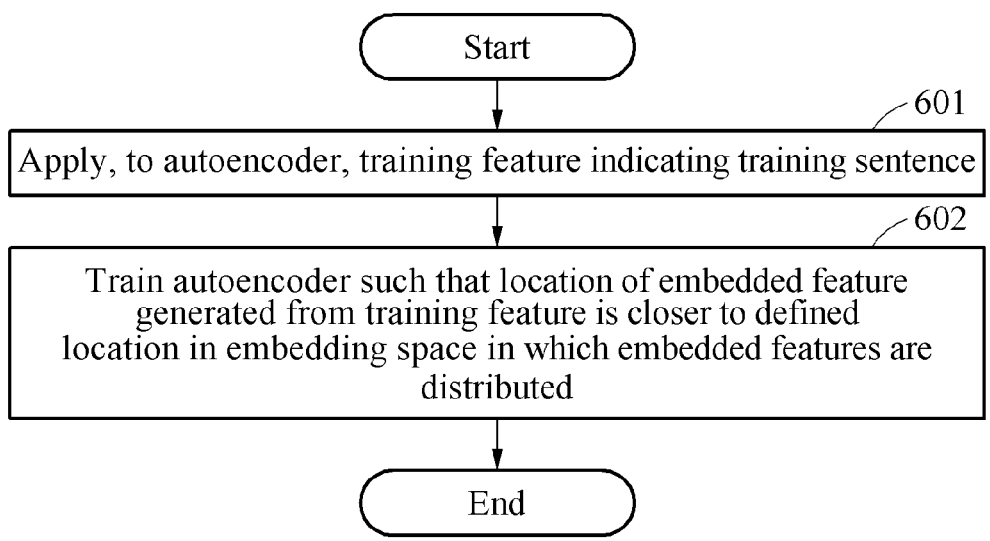
FIG. 6 is a diagram illustrating an example of a training method to determine a domain of a sentence.

FIG. 6 is a diagram illustrating an example of a training method to determine a domain of a sentence. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer that perform the specified functions, or combinations of special purpose hardware and computer instructions. In addition to the description of FIG. 6 below, the descriptions of FIGS. 1-5 is also applicable to FIG. 6, and are incorporated herein by reference. Thus, the above description may not be repeated here.

Referring to FIG. 6, in operation 601, a training apparatus for determining a domain of a sentence, hereinafter simply referred to as a domain determination training apparatus, applies a training feature indicating a training sentence to an autoencoder. The domain determination training apparatus refers to an apparatus for training the autoencoder to determine a domain of a sentence, and may be embodied by, for example, a hardware module, or a software implemented on a hardware module. The training feature refers to data for training the autoencoder, and may be designed as a vector or a function corresponding to an input layer of the autoencoder.

In operation 602, the domain determination training apparatus trains the autoencoder such that a location of an embedded feature generated from the training feature is closer to a defined location in an embedding space. The domain determination training apparatus may use various training methods to optimize weights among nodes in the autoencoder, without departing from the spirit and scope of the illustrative examples described. Respective training methods for the examples of the domain determining method described with reference to FIGS. 3, 4, and 5 will be described hereinafter with reference to FIGS. 7, 8, and 9, respectively.

Figure 7:
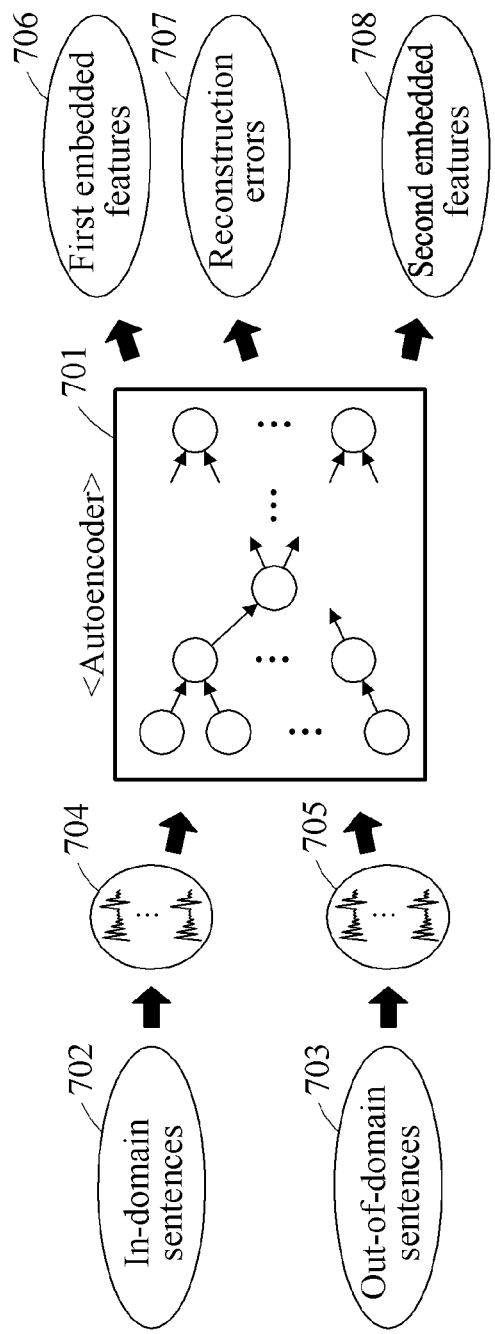
FIG. 7 is a diagram illustrating an example of a training method to determine a domain of a sentence.

FIG. 7 is a diagram illustrating an example of a training method to determine a domain of a sentence.

Referring to FIG. 7, a domain determination training apparatus applies, to an autoencoder 701, first training features 704 indicating in-domain sentences 702. The domain determination training apparatus applies, to the autoencoder 701, second training features 705 indicating out-of-domain sentences 703.

The domain determination training apparatus obtains first embedded features 706 generated from the first training features 704 by the autoencoder. The domain determination training apparatus obtains reconstructed features generated from the first embedded features 706 by the autoencoder 701. The domain determination training apparatus trains the autoencoder 701 such that reconstruction errors 707 between the reconstructed features generated from the first embedded features 706 and the first training features 704 are reduced.

The domain determination training apparatus obtains second embedded features 708 generated from the second training features 705 by the autoencoder 701. The domain determination training apparatus trains the autoencoder 701 such that locations of the second embedded features 708 are closer to a location in an embedding space.

Figure 8:
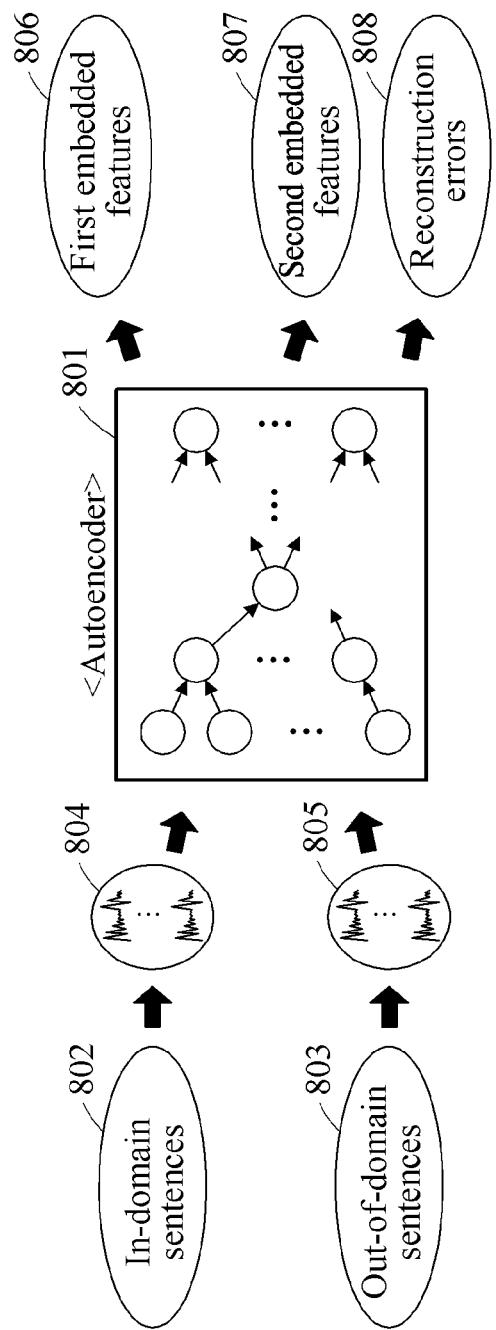
FIG. 8 is a diagram illustrating an example of a training method to determine a domain of a sentence.

FIG. 8 is a diagram illustrating an example of a training method to determine a domain of a sentence.

Referring to FIG. 8, a domain determination training apparatus applies, to an autoencoder 801, first training features 804 indicating in-domain sentences 802. The domain determination training apparatus applies, to the autoencoder 801, second training features 805 indicating out-of-domain sentences 803. In an example, the domain determination training apparatus trains an autoencoder in association with an embedded feature close to a location in an embedding space and with an embedded feature separated far away from the location, as opposed to the example described above with reference to FIG. 7.

The domain determination training apparatus obtains first embedded features 806 generated from the first training features 804 by the autoencoder 801. The domain determination training apparatus trains the autoencoder 801 such that locations of the first embedded features 806 are closer to a location in the embedding space.

The domain determination training apparatus obtains second embedded features 807 generated from the second training features 805 by the autoencoder 801. The domain determination training apparatus obtains reconstructed features generated from the second embedded features 807 by the autoencoder 801. The domain determination training apparatus trains the autoencoder 801 such that reconstruction errors 808 between the reconstructed features generated from the second embedded features 807 and the second training features 805 are reduced.

Figure 9:
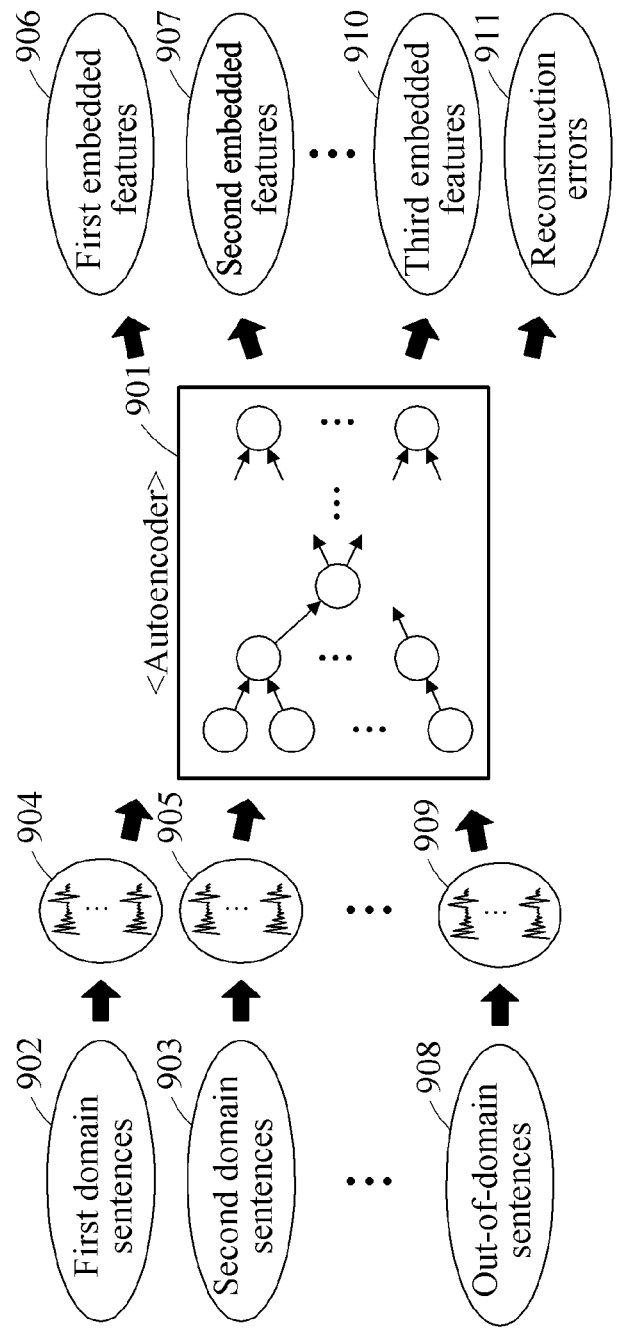
FIG. 9 is a diagram illustrating an example of a training method to determine a domain of a sentence.

FIG. 9 is a diagram illustrating an example of a training method to determine a domain of a sentence.

Referring to FIG. 9, a domain determination training apparatus applies, to an autoencoder 901, first training features 904 indicating first domain sentences 902. The domain determination training apparatus applies, to the autoencoder 901, second training features 905 indicating second domain sentences 903. The domain determination training apparatus applies, to the autoencoder 901, third training features 909 indicating out-of-domain sentences 908. Although an example of an operation of training an autoencoder to determine whether an input sentence is an in-domain sentence or an out-of-domain sentence is described with reference to FIGS. 7 and 8, the domain determination training apparatus may also train the autoencoder to determine a domain to which the input sentence belongs among a plurality of domains. Thus, the above description with reference to FIGS. 7 and 8 are incorporated herein by reference.

The domain determination training apparatus obtains locations of first embedded features 906 generated from the first training features 904 by the autoencoder 901. The domain determination training apparatus trains the autoencoder 901 such that the locations of the first embedded features 906 are closer to a first location in an embedding space.

The domain determination training apparatus obtains locations of second embedded features 907 generated from the second training features 905 by the autoencoder 901. The domain determination training apparatus trains the autoencoder 901 such that the locations of the second embedded features 905 are to be closer to a second location in the embedding space.

The domain determination training apparatus obtains third embedded features 910 generated from the third training features 909 by the autoencoder 901. The domain determination training apparatus obtains reconstructed features generated from the third embedded features 910 by the autoencoder 901. The domain determination training apparatus trains the autoencoder 901 such that reconstruction errors 911 between the reconstructed features generated from the third embedded features 910 and the third training features 909 are reduced.

Figure 10:
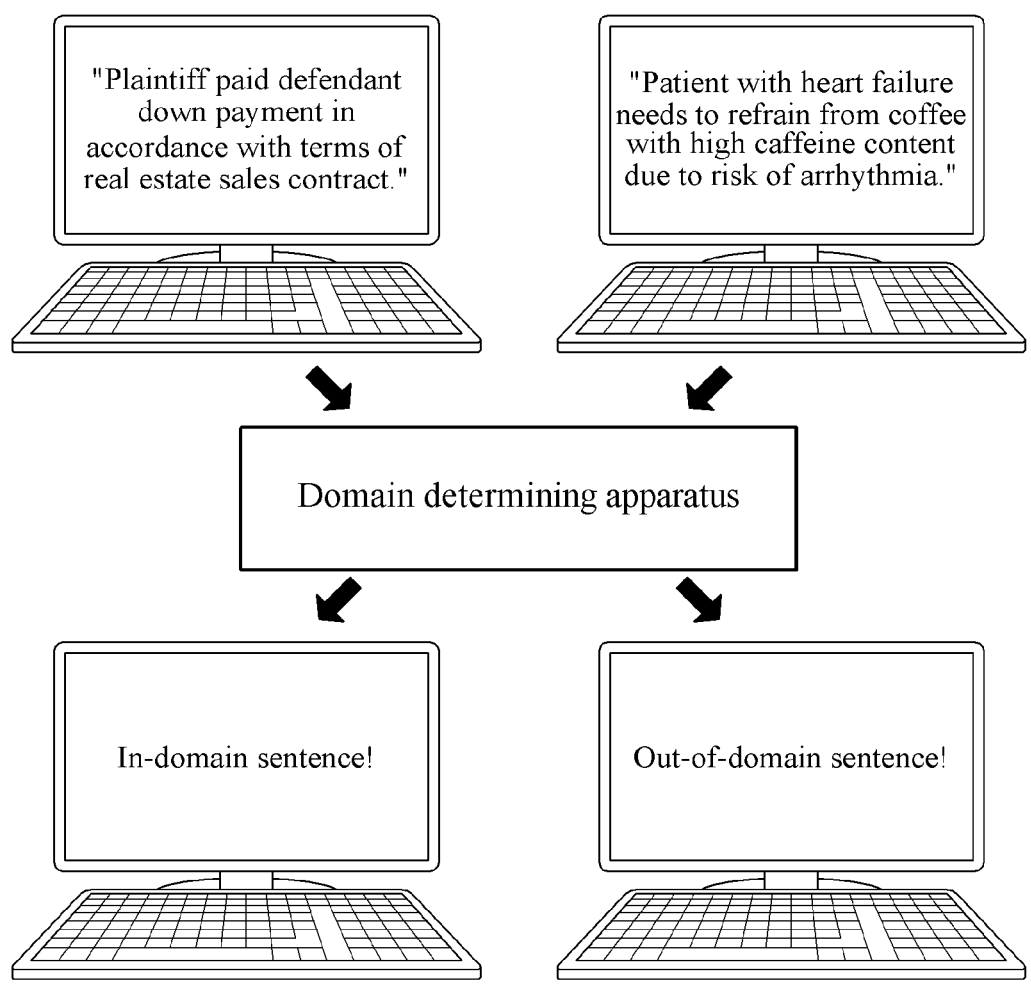
FIG. 10 is a diagram illustrating an example of an operation of an apparatus for determining a domain of a sentence.

FIG. 10 is a diagram illustrating an example of an operation of a domain determining apparatus.

Referring to FIG. 10, a domain determining apparatus determines whether an input sentence is an in-domain sentence or an out-of-domain sentence. For example, as illustrated, the domain determining apparatus determines that an input sentence, "a plaintiff paid a defendant a down payment in accordance with terms of a real estate sales contract," is an in-domain sentence. In addition, the domain determining apparatus determines that an input sentence, "a patient with heart failure needs to refrain from coffee with high caffeine content because of a risk of arrhythmia," is an out-of-domain sentence.

Figure 11:
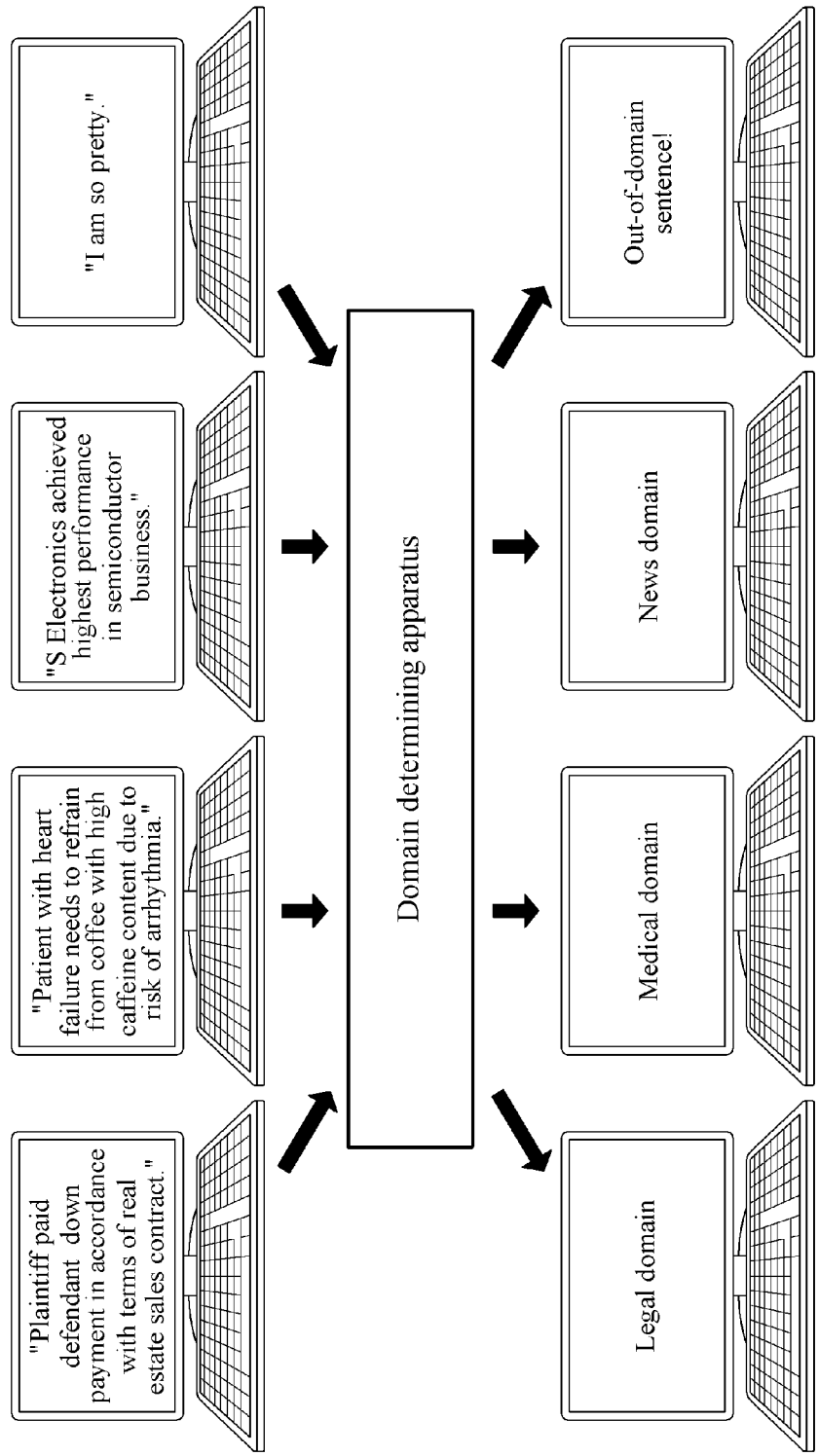
FIG. 11 is a diagram illustrating an example of an operation of an apparatus for determining a domain of a sentence.

FIG. 11 is a diagram illustrating an example of an operation of a domain determining apparatus.

Referring to FIG. 11, a domain determining apparatus determines which one of a plurality of domains an input sentence belongs to. For example, as illustrated, the domain determining apparatus determines that an input sentence, "a plaintiff paid a defendant a down payment in accordance with terms of a real estate sales contract," belongs to a legal domain. The domain determining apparatus determines that an input sentence, "a patient with heart failure needs to refrain from coffee with a high caffeine content because of a risk of arrhythmia," belongs to a medical domain. The domain determining apparatus determines that an input sentence, "S Electronics achieved a highest performance in a semiconductor business," belongs to a news domain. The domain determining apparatus determines that an input sentence, "I am so pretty," belongs to an out-of-domain sentence. In an example, the domain determining apparatus may be used to determine a domain of a sentence in a language-based recognition system.

Figure 12:
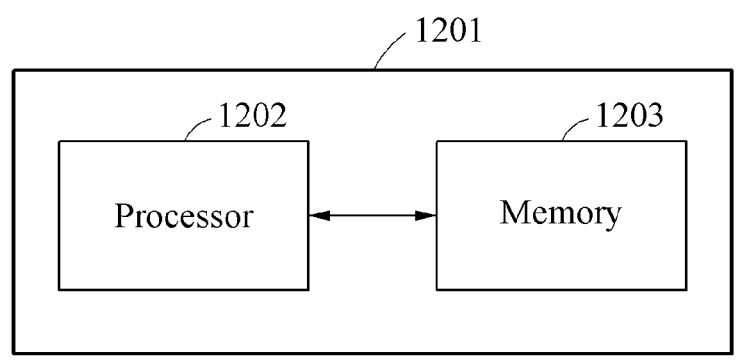
FIG. 12 is a diagram illustrating an example of an apparatus.

FIG. 12 is a diagram illustrating an example of an apparatus.

Referring to FIG. 12, an apparatus 1201 includes a processor 1202 and a memory 1203. The apparatus 1201 may be a domain determining apparatus or a domain determination training apparatus, as described above. The processor 1202 may include at least one apparatus describe with reference to FIGS. 1 through 11, or perform at least one method described with reference to FIGS. 1 through 11. The memory 1203 may store information associated with a domain determining method or a training method to determine a domain, which is described above, or store a program in which the domain determining method or the training method is embodied. The memory 1203 may be a volatile memory or a nonvolatile memory, as further described below.

The processor 1202 may implement the program and control the apparatus 1201. A code of the program to be implemented by the processor 1202 may be stored in the memory 1203. The apparatus 1201 may be connected to an external device, for example, a personal computer (PC) and a network, through an input and output device (not shown), and exchange data with the external device.

In an example, the apparatus 1201 is embodied or incorporated in various types of products such as, for example, an intelligent agent, a mobile phone, a cellular phone, a smart phone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a server, a personal computer (PC), a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device, portable navigation device (PND), a handheld game console, an e-book, a high definition television (HDTV), a smart appliance, communication systems, image processing systems, graphics processing systems, various Internet of Things (IoT) devices that are controlled through a network, a smart vehicle, an intelligent automobile, an autonomous driving vehicle, other consumer electronics/information technology (CE/IT) device, or any other device capable of wireless communication or network communication consistent with that disclosed herein.

The autoencoder 202, 701, 801, 901, apparatus 1201, and other apparatuses, units, modules, devices, and other components illustrated in FIGS. 1-12 that perform the operations described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 and 6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software includes at least one of an applet, a dynamic link library (DLL), middleware, firmware, a device driver, an application program storing the method of preventing the collision. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of determining a domain of a sentence, the method comprising:
    generating, using an autoencoder, an embedded feature from an input feature indicating an input sentence; and
    determining a domain of the input sentence based on a location of the embedded feature in an embedding space where embedded features are distributed,
    wherein the determining of the domain comprises:
    determining whether the input sentence is an in-domain sentence or an out-of-domain sentence, based on a distance between the location of the embedded feature and a specified location.

2. The method of claim 1, wherein the autoencoder is trained such that embedded features indicating out-of-domain sentences are closer to the specified location, and
    the determining of the domain comprises determining the input sentence to be the out-of-domain sentence, in response to the distance being less than a threshold distance.

3. The method of claim 2, wherein the determining of the domain comprises:
    generating a reconstructed feature from the embedded feature using the autoencoder, in response to the distance being greater than the threshold distance;
    generating a reconstruction error based on the input feature and the reconstructed feature; and determining the input sentence to be the out-of-domain sentence, in response to the reconstruction error being greater than a threshold error.

4. The method of claim 1, wherein the autoencoder is trained such that embedded features indicating in-domain sentences are closer to the specified location, and
the determining of the domain comprises determining the input sentence to be the out-of-domain sentence, in response to the distance being greater than a threshold distance.

5. The method of claim 4, wherein the determining of the domain comprises:
generating a reconstructed feature from the embedded feature using the autoencoder, in response to the distance being less than the threshold distance;
generating a reconstruction error based on the input feature and the reconstructed feature; and
determining the input sentence to the out-of-domain sentence, in response to the reconstruction error being less than a threshold error.

6. The method of claim 1, wherein the specified location is an original point in the embedding space.

7. The method of claim 1, wherein the determining of the domain comprises:
calculating an Lp-norm or a Kullback-Leibler divergence (KLD) based on the location of the embedded feature and the specified location; and
determining the distance between the location of the embedded feature and the specified location based on the calculating of the Lp-norm or the KLD divergence.

8. The method of claim 1, wherein the determining of the domain comprises:
generating a reconstructed feature from the embedded feature using the autoencoder;
generating a reconstruction error based on the input feature and the reconstructed feature; and
determining the domain of the input sentence based on the reconstruction error and the location of the embedded feature.

9. The method of claim 1, wherein the embedded feature is an activation value or a pre-activation value of a hidden layer in the autoencoder.

10. The method of claim 1, wherein the input feature is an embedded feature generated from the input sentence by a neural network.

11. The method of claim 1, wherein the input feature comprises any one or any combination of one-hot vector, a real vector, or a function corresponding to an input layer in the autoencoder.

12. The method of claim 3, wherein the reconstructed feature comprises any one or any combination of one-hot vector, a real vector, or a function corresponding to an output layer in the autoencoder.

13. The method of claim 1, wherein the determining of the domain comprises:
determining the domain of the input sentence from among reference domains based on specified locations respectively corresponding to the reference domains and the location of the embedded feature.

14. The method of claim 13, wherein the autoencoder is trained such that embedded features indicating in-domain sentences respectively belonging to the reference domains are closer to the specified locations, respectively, and
the determining of the domain of the input sentence comprises:
identifying a second location closest to the location of the embedded feature among the specified locations; and
determining that the input sentence belongs to a second domain corresponding to the second location based on whether a distance between the location of the embedded feature and the second location is less than a threshold distance.

15. The method of claim 14, wherein the determining that the input sentence belongs to the second domain comprises:
generating a reconstructed feature from the embedded feature using the autoencoder, in response to the distance between the location of the embedded feature and the second location being less than the threshold distance;
generating a reconstruction error based on the input feature and the reconstructed feature; and
determining the input sentence to be an out-of-domain sentence, in response to the reconstruction error being less than a threshold error, wherein the out-of-domain sentence is a sentence not belonging to the reference domains.

16. A non-transitory computer-readable storage medium storing instructions that, when executed by a processor, cause the processor to perform the method of claim 1.

17. A training method to determine a domain of a sentence, the training method comprising:
applying, to an autoencoder, at least one training feature indicating a training sentence; and
training the autoencoder such that a location of an embedded feature generated from the training feature is closer to a specified location in an embedding space where embedded features are distributed, wherein
the trained autoencoder is configured to determine whether a domain of the training sentence is in-domain or out-of-domain, based on a determined distance between the location of the embedded feature and the specified location.

18. The training method of claim 17, wherein the applying of the at least one training feature to the autoencoder comprises:
applying a first training feature indicating an in-domain sentence to the autoencoder; and
applying a second training feature indicating an out-of-domain sentence to the autoencoder, and the training of the autoencoder comprises:
obtaining a first embedded feature generated from the first training feature;
training the autoencoder such that a reconstruction error between a reconstructed feature generated from the first embedded feature and the first training feature is reduced; and
training the autoencoder such that a location of a second embedded feature generated from the second training feature is closer to a second location in the embedding space.

19. The training method of claim 17, wherein the applying of the at least one training feature to the autoencoder comprises:
applying a first training feature indicating an in-domain sentence to the autoencoder; and
applying a second training feature indicating an out-of-domain sentence to the autoencoder, and the training of the autoencoder comprises:
training the autoencoder such that a location of a first embedded feature generated from the first training feature is closer to a first location in the embedding space;
obtaining a second embedded feature generated from the second training feature; and training the autoencoder such that a reconstruction error between a reconstructed feature generated from the second embedded feature and the second training feature is reduced.

20. The training method of claim 17, wherein the applying of the at least one training feature to the autoencoder comprises:
  applying a first training feature indicating a first domain sentence to the autoencoder;
  applying a second training feature indicating a second domain sentence to the autoencoder; and
  applying a third training feature indicating a sentence not belonging to domains, and the training of the autoencoder comprises:
  training the autoencoder such that a location of a first embedded feature generated from the first training feature is closer to a first location in the embedding space;
  training the autoencoder such that a location of a second embedded feature generated from the second training feature is closer to a second location in the embedding space;
  obtaining a third embedded feature generated from the third training feature; and
  training the autoencoder such that a reconstruction error between a reconstructed feature generated from the third embedded feature and the third training feature is reduced.

21. A non-transitory computer-readable storage medium storing instructions that, when executed by a processor, cause the processor to perform the method of claim 17.

22. An apparatus for determining a domain of a sentence, the apparatus comprising:
  a processor configured to:
  generate, using an autoencoder, an embedded feature from an input feature indicating an input sentence; and
  determine a domain of the input sentence based on a location of the embedded feature in an embedding space where embedded features are distributed, wherein the processor is configured to determine whether the input sentence is an in-domain sentence or an out-of-domain sentence, based on a distance between the location of the embedded feature and a specified location.

23. A training apparatus to determine a domain of a sentence, the training apparatus comprising:
  a processor configured to:
  apply a training feature indicating a training sentence to an autoencoder; and
  train the autoencoder such that a location of an embedded feature generated from the training feature is to be closer to a specified location in an embedding space where embedded features are distributed, wherein
  the trained autoencoder is configured to determine whether a domain of the training sentence is in-domain or out-of-domain, based on a determined distance between the location of the embedded feature and the specified location.

* * * * *